US012237626B2

(12) United States Patent
Masuda et al.

(10) Patent No.: US 12,237,626 B2
(45) Date of Patent: Feb. 25, 2025

(54) WIRE HARNESS

(71) Applicant: Yazaki Corporation, Tokyo (JP)

(72) Inventors: Satoki Masuda, Makinohara (JP); Yoshinao Sato, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 346 days.

(21) Appl. No.: 17/850,062

(22) Filed: Jun. 27, 2022

(65) Prior Publication Data

US 2023/0027106 A1 Jan. 26, 2023

(30) Foreign Application Priority Data

Jul. 21, 2021 (JP) ................................ 2021-120594

(51) Int. Cl.

*H01R 13/56* (2006.01)
*H01B 7/00* (2006.01)
*H01R 13/6592* (2011.01)
*H01R 13/74* (2006.01)

(52) U.S. Cl.

CPC ......... *H01R 13/748* (2013.01); *H01B 7/0045* (2013.01); *H01R 13/6592* (2013.01)

(58) Field of Classification Search

CPC .............. H01R 13/748; H01R 13/6592; H01R 13/6456; H01R 2105/00; H01R 24/28; H01B 7/0045
USPC .......................................................... 439/659
See application file for complete search history.

(56) References Cited

U.S. PATENT DOCUMENTS

| | | | | |
|---|---|---|---|---|
| 9,293,878 B2 * | 3/2016 | Tashiro | ................ | H01R 35/025 |
| 9,343,842 B2 * | 5/2016 | Tashiro | ................ | H01R 13/506 |
| 9,929,491 B2 * | 3/2018 | Yamaguchi | ............ | H01R 11/12 |
| 10,074,926 B2 * | 9/2018 | Rui | .................... | H01R 13/5202 |
| 10,573,988 B2 * | 2/2020 | Mellott | .................. | H01R 13/62 |
| 11,190,000 B2 * | 11/2021 | Iizuka | .................... | H02G 15/04 |
| D972,513 S * | 12/2022 | Okayasu | ...................... | D13/133 |
| D973,023 S * | 12/2022 | Okayasu | ...................... | D13/133 |
| 2004/0106325 A1 * | 6/2004 | Miyazaki | ............ | H01R 13/648<br>439/564 |
| 2011/0207354 A1 * | 8/2011 | Tashiro | ................ | H01R 13/506<br>439/271 |
| 2012/0021632 A1 * | 1/2012 | Matsumoto | ........ | H01R 13/5208<br>439/271 |

(Continued)

FOREIGN PATENT DOCUMENTS

| | | |
|---|---|---|
| JP | 2006-155986 A | 6/2006 |
| JP | 2019-175728 A | 10/2019 |

(Continued)

*Primary Examiner* — Alexander Gilman
(74) *Attorney, Agent, or Firm* — Sughrue Mion, PLLC

(57) ABSTRACT

A wire harness includes a cable constituted of a plurality of electric wires bundled together so as to include a plurality of cable ends and a plurality of connectors mounted one-to-one on the plurality of cable ends, wherein each of the plurality of connectors includes a connector terminal connected to an end of the electric wire, a tubular housing body accommodating the connector terminal, and a flange formed to project from an outer circumferential surface of the housing body. On a fitting side for fitting with a mating connector, the flange has a rugged shape that differs between the plurality of connectors.

4 Claims, 7 Drawing Sheets

(56) References Cited

U.S. PATENT DOCUMENTS

2013/0017719 A1* 1/2013 Tanaka ................. H01R 13/521
439/587
2013/0189879 A1* 7/2013 Kondo ..................... H01R 9/03
439/607.44
2013/0203286 A1* 8/2013 Fujiwara .............. H01R 13/516
439/554
2013/0227839 A1* 9/2013 Lee ........................ H01R 43/24
29/858
2013/0322049 A1* 12/2013 Ishikawa .............. H01R 13/502
361/823
2014/0094049 A1* 4/2014 Ohyama .............. H01R 43/005
439/275
2014/0305696 A1* 10/2014 Tanaka ................... H02G 15/02
174/71 R
2015/0099396 A1* 4/2015 Mori .................... H01R 13/405
439/606
2015/0126055 A1* 5/2015 Morita ................... H01R 24/28
439/323
2015/0126056 A1* 5/2015 Morita ............... H01R 13/5216
439/323
2015/0233980 A1* 8/2015 Umetsu .............. H01R 13/6683
439/620.22
2015/0288090 A1* 10/2015 Shigeta .............. H01R 13/5202
439/587
2015/0325947 A1* 11/2015 Wang ................. H01R 13/5202
277/616
2016/0255750 A1* 9/2016 Yoshida ................... H01B 7/04
174/359
2017/0310024 A1* 10/2017 Adam .................. H01R 9/0518
2018/0019544 A1* 1/2018 Ishibashi ................ H02K 11/30
2018/0358748 A1* 12/2018 Yamanashi ............ H01R 24/62
2019/0027871 A1* 1/2019 Data .................. H01R 13/6596
2019/0173240 A1* 6/2019 Nakamura .......... B60R 16/0238
2020/0328554 A1* 10/2020 Asano ..................... H01R 13/74
2021/0098154 A1* 4/2021 Wrighton ............. H01R 9/0518

FOREIGN PATENT DOCUMENTS

JP 2019-212583 A 12/2019
KR 10-2013-0038442 A 4/2013

* cited by examiner

WIRE HARNESS

TECHNICAL FIELD

The present invention relates to a wire harness in which a connector is mounted on a cable end.

BACKGROUND

Conventionally, a wire harness in which a connector is mounted on a cable end is widely used for connection of various electrical and electronic devices (e.g., see Patent Document 1). In some of the wire harnesses as described above, the connectors mounted on the plurality of cable ends are similar connectors in which shapes of housing bodies, configurations of the housing bodies for housing connector terminals, etc. are similar to each other. The wire harnesses using such similar connectors have many advantages in manufacturing, such as common assembly procedure for the connectors during manufacture.

RELATED ART

Patent Document 1: JP 2019-098978 A

SUMMARY OF THE INVENTION

Problem to be Solved by the Invention

However, in the wire harness using the similar connectors, this similarity of the connectors may cause wrong assembly during manufacture of the wire harness, e.g., a connector that is different from a connector to be properly mounted could be mounted onto a cable end.

The present invention focuses on the problem as described above, and an object of the present invention is to provide a wire harness capable of preventing wrong assembly of a connector during manufacture.

Solution to the Problem

In order to achieve the above-described object, the present invention provides, in one aspect, a wire harness including a cable constituted of a plurality of electric wires bundled together so as to include a plurality of cable ends, and a plurality of connectors mounted one-to-one onto the plurality of cable ends, wherein each of the plurality of connectors includes a connector terminal connected to an end of the electric wire, a tubular housing body that accommodates therein the connector terminal, and a flange formed to project from an outer circumferential surface of the housing body, wherein, on a fitting side for fitting with a mating connector, the flange has a rugged shape that differs between the plurality of connectors.

Advantageous Effect of the Invention

According to the wire harness described above, the respective housing bodies of the plurality of connectors mounted on the plurality of cable ends are provided with the flanges having rugged shapes that differ from each other between the plurality of connectors. Thus, even when the plurality of connectors are similar connectors, wrong assembly of the connector during manufacture can be prevented by carrying out an operation such as performing assembly by installing the housing body onto a jig that fits with the rugged shape of each flange.

DETAILED DESCRIPTION OF THE EXEMPLARY EMBODIMENTS

In the following, one embodiment of a wire harness is explained.

Figure 1:
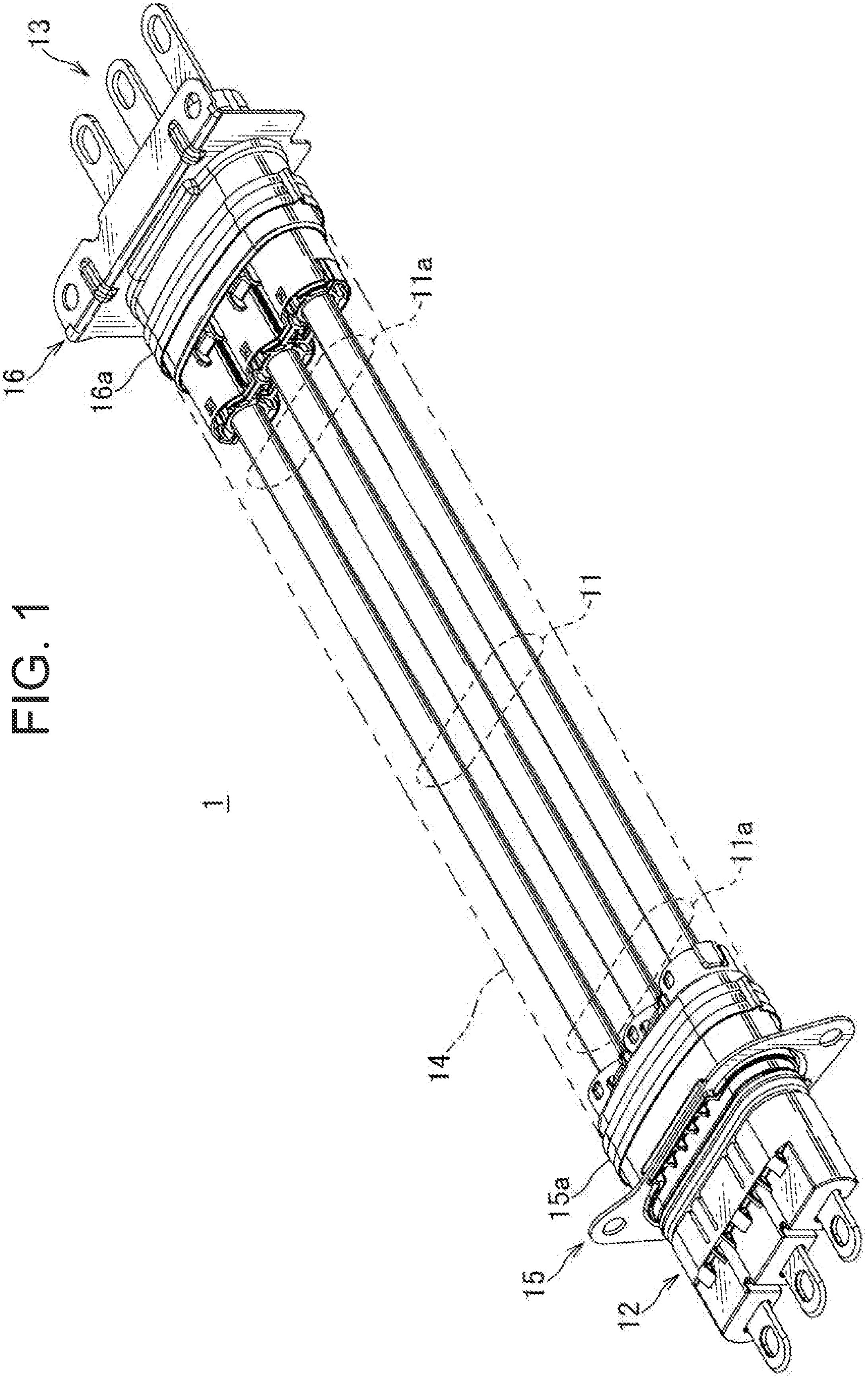
FIG. 1 is a perspective view showing a wire harness according to one embodiment.
Figure 2:
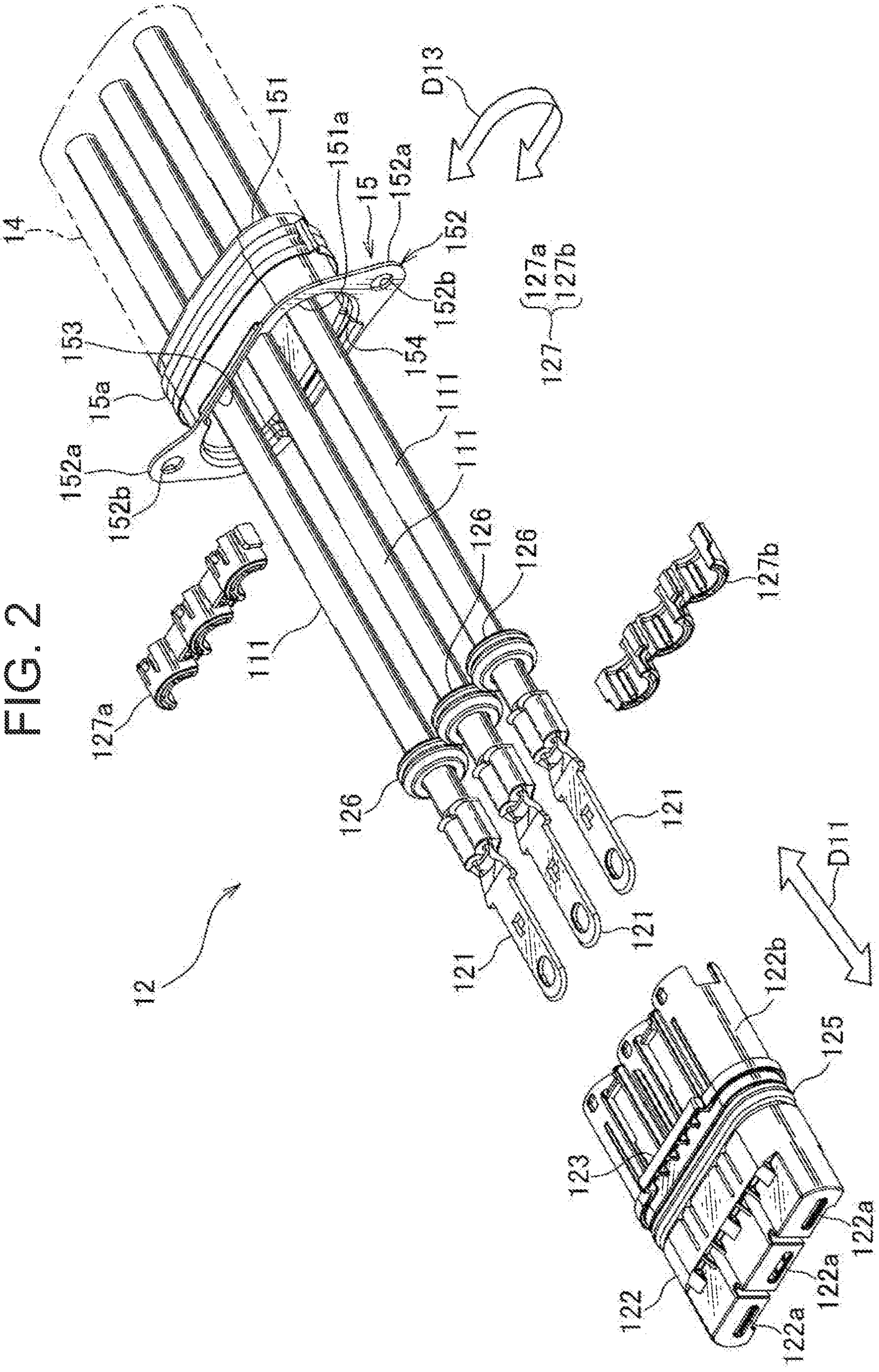
FIG. 2 is an exploded perspective view of a first connector of the wire harness shown in FIG. 1.

FIG. 1 is a perspective view showing a wire harness according to one embodiment. FIG. 2 is an exploded perspective view of a first connector of the wire harness shown in FIG. 1, and FIG. 3 is an exploded perspective view of a second connector of the wire harness shown in FIG. 1.

Figure 3:
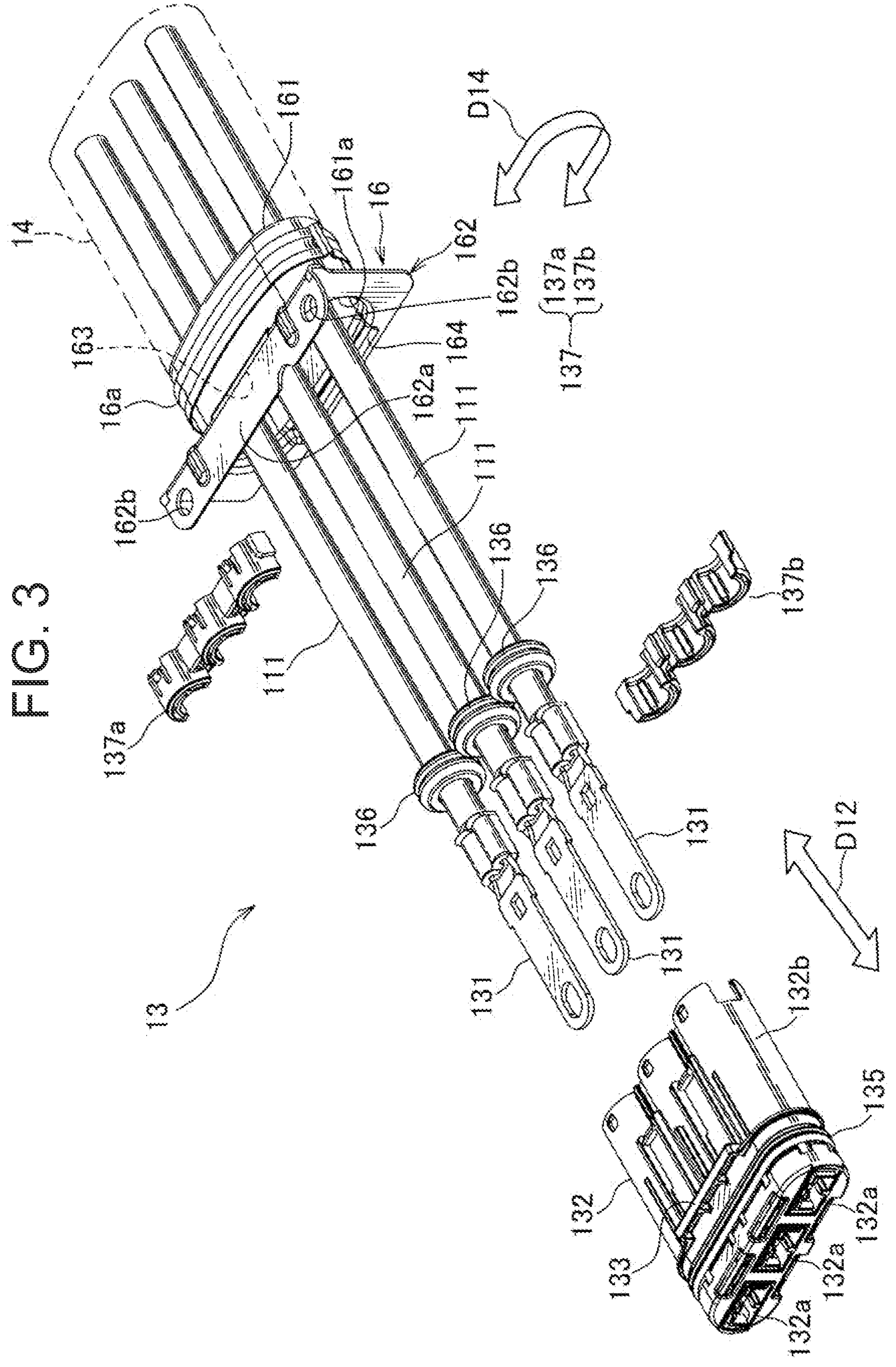
FIG. 3 is an exploded perspective view of a second connector of the wire harness shown in FIG. 1.

The wire harness 1 shown in FIGS. 1-3 is a member that connects two electrical and electronic devices (not shown) to each other and is used for transmission of high-frequency electrical signals. The wire harness 1 includes a plurality of (two, in this embodiment) connectors connected to a cable 11 accommodated inside the tubular shield braid 14. Further, the wire harness 1 includes the cable 11, a first connector 12, a second connector 13, the shield braid 14, a first shield shell 15, and a second shield shell 16.

The cable 11 is apart in which the plurality of (three, in this embodiment) electric wires 111 is bundled together to provide two cable ends 11*a*.

The first connector 12 and the second connector 13 are two connectors mounted one-to-one on the two cable ends 11*a*.

Figure 4:
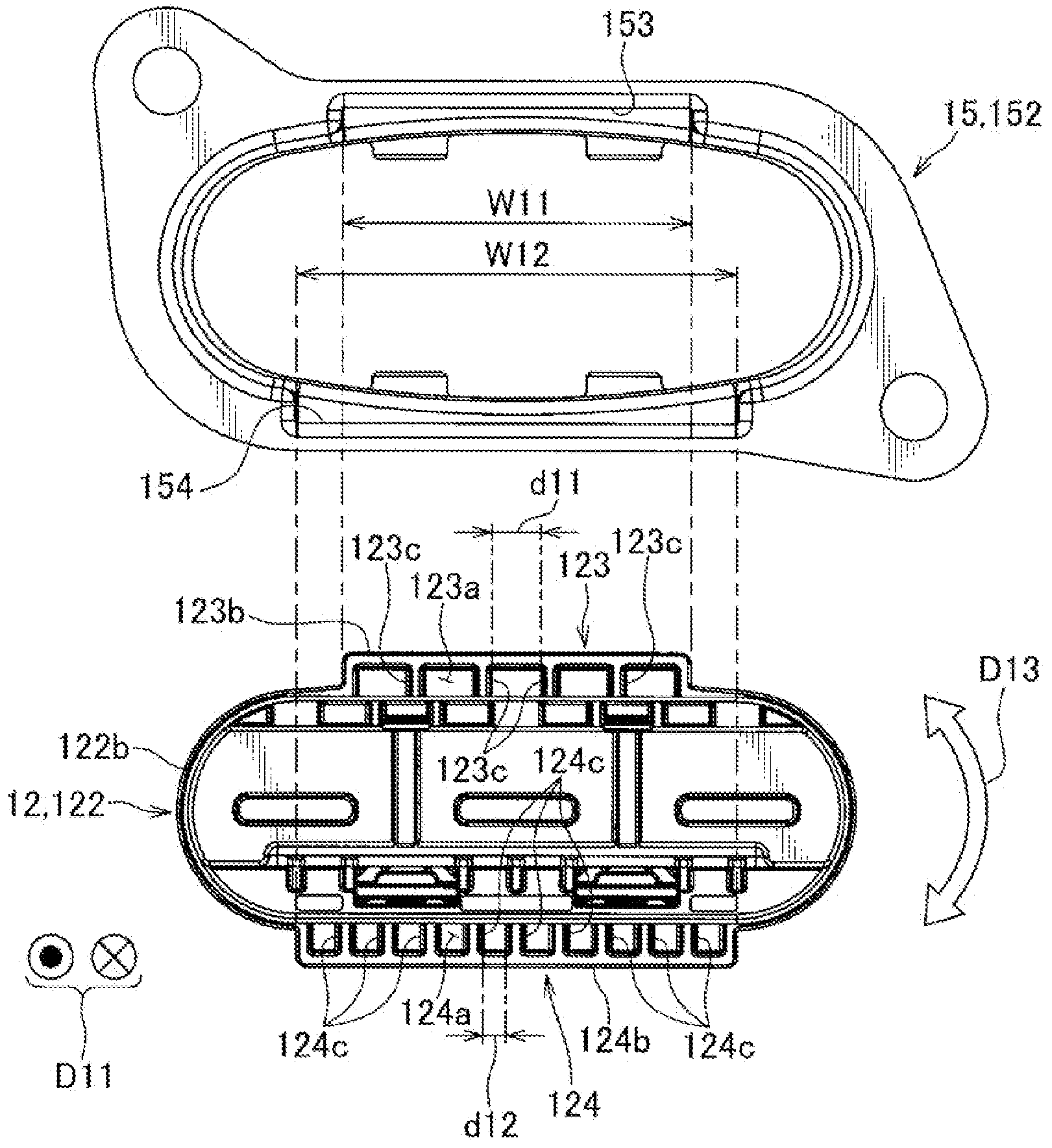
FIG. 4 shows plan views of a housing and a first shield shell of the first connector shown in FIG. 2, the plan views are shown one above the other and each viewed from its fitting side.

As shown in FIG. 2, the first connector 12 includes a connector terminal 121, a housing body 122, a first flange 123, a second flange 124 shown in FIG. 4, a connector fitting packing 125, an electric wire packing 126, and a rear holder 127.

The connector terminal 121 is a round terminal which is crimp connected to an end of each of the three electric wires 111, and three connector terminals 121 are provided in this embodiment.

The housing body 122 is a member constituted of three tubular parts that are integrally formed with resin, the tubular parts accommodating therein the connector terminals 121 in a one-to-one manner. The tubular part includes an opening 122*a* which is provided on a fitting side of each tubular part and through which a distal end of the connector terminal 121 protrudes, and the connector terminal 121 is inserted from an opening on the opposite side thereof such that the connector terminal 121 is accommodate and held with the distal end thereof protruded from the opening 122*a*.

The first flange 123 is a part formed integrally with the housing body 122 by resin so as to project from an outer circumferential surface 122*b* of the housing body 122 at a middle position in an axial direction D11. On a fitting side for fitting with a mating connector, the first flange 123 has a rugged shape that differs between the first connector 12 and the second connector 13. Further, although hidden in FIGS. 1-3, the second flange 124 is provided at the same position as the first flange 123 in the axial direction D11 and at a position apart from the first flange 123 in a circumferential direction D13. Details of the first flange 123 and the second flange 124 not shown in FIGS. 1-3 will be described later with reference to FIG. 4.

The connector fitting packing 125 is a ring-shaped packing made of rubber.

This connector fitting packing 125 is fitted onto the outer circumferential surface 122*b* of the housing body 122 on the side closer to the fitting side than the first flange 123, and serves to prevent entry of water or the like from a space between the connectors when fitted to the mating connector not shown.

The electric wire packings 126 are three packings each formed in a ring shape and made of rubber. Each electric wire packing 126 is fitted in the vicinity of a crimped portion of each electric wire 111 where the connector terminal 121 is crimped, and is accommodated inside the housing body 122. Each electric wire packing 126 serves to prevent entry of water or the like from a space between each electric wire 111 and the housing body 122.

The rear holder 127 is a member that is accommodated, locked and fixed in the above-described opening on the opposite side of the housing body 122 so as to push the three electric wire packings 126 into the housing body 122 from the opposite side of the three electric wire packings 126 with respect to the fitting side. As shown in FIG. 2, the rear holder 127 is constituted of two parts, i.e., a first holder 127*a* and a second holder 127*b*, that sandwich the three electric wires 111 in a radial direction.

Figure 5:
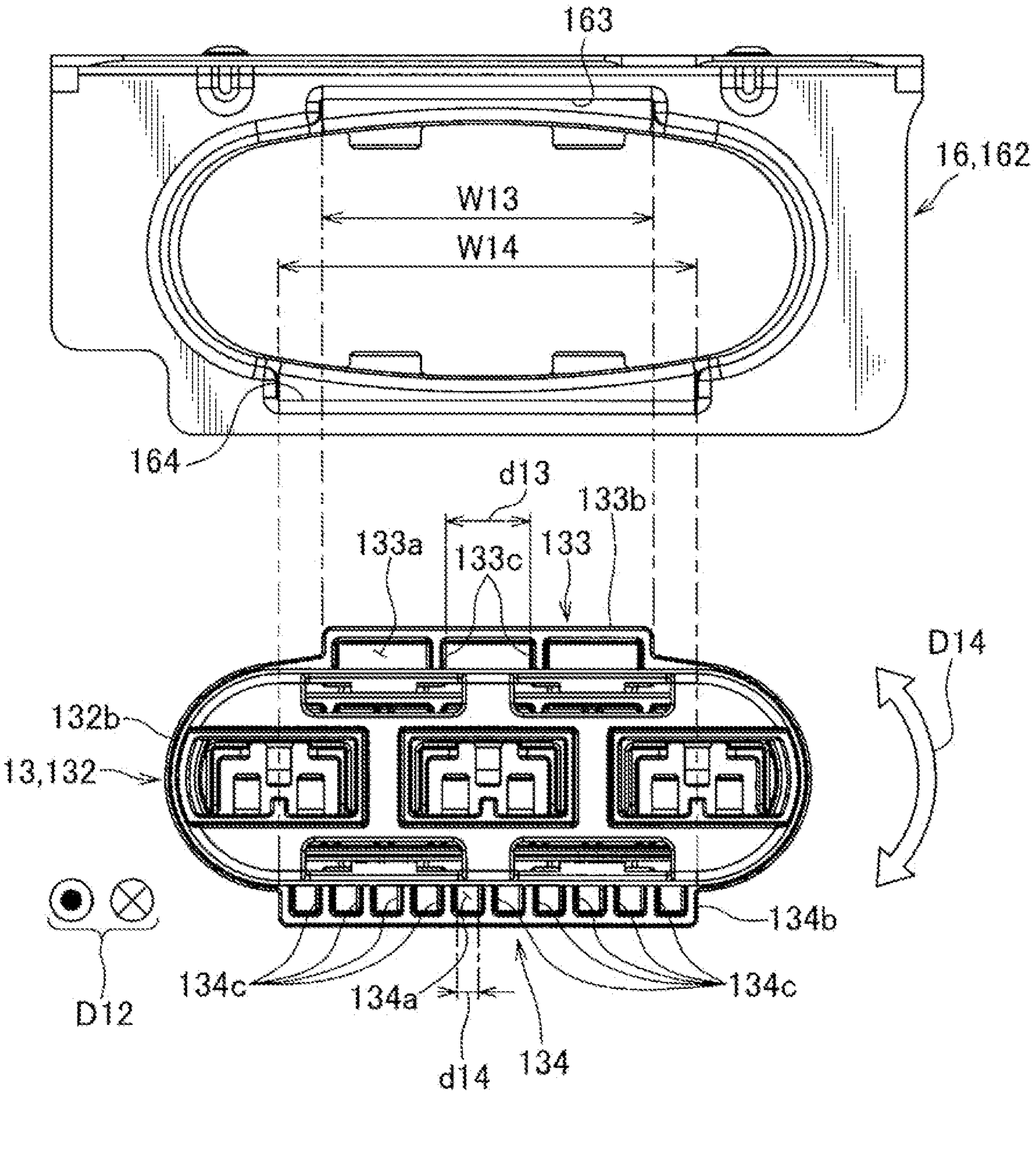
FIG. 5 shows plan views of a housing and a second shield shell of the second connector shown in FIG. 3, the plan views are shown one above the other and each viewed from its fitting side.

As shown in FIG. 3, the second connector 13 includes a connector terminal 131, a housing body 132, a first flange 133, a second flange 134 shown in FIG. 5, a connector fitting packing 135, an electric wire packing 136, and a rear holder 137.

The connector terminal 131 is a round terminal which is crimp connected to an end of each of the three electric wires 111, and three connector terminals 131 are provided in this embodiment.

The housing body 132 is a member constituted of three tubular parts that are integrally formed with resin, the tubular parts accommodating therein the connector terminals 131 in a one-to-one manner. The tubular part includes an opening 132*a* which is provided on a fitting side of each tubular part and through which a distal end of the connector terminal 131 protrudes, and the connector terminal 131 is inserted from an opening on the opposite side thereof such that the connector terminal 131 is accommodated and held with the distal end protruded from the opening 132*a*.

The first flange 133 is a part formed integrally with the housing body 132 by resin so as to project from an outer circumferential surface 132*b* of the housing body 132 at a middle position in an axial direction D12. On a fitting side for fitting with a mating connector, the first flange 133 has a rugged shape that differs between the first connector 12 and the second connector 13. Although hidden in FIGS. 1-3, the second flange 134 is provided at the same position as the first flange 133 in the axial direction D12 and at a position apart from the first flange 133 in a circumferential direction D14. Details of the first flange 133 and the second flange 134 not shown in FIGS. 1-3 will be described later with reference to FIG. 5.

The connector fitting packing 135 is a ring-shaped packing made of rubber.

This connector fitting packing 135 is fitted onto the outer circumferential surface 132*b* of the housing body 132 on the side closer to the fitting side than the first flange 133, and serves to prevent entry of water or the like from a space between the connectors when fitted to a mating connector not shown.

The electric wire packings 136 are three packings formed in a ring shape and made of rubber. Each electric wire packing 136 is fitted in the vicinity of a crimped portion on each electric wire 111 where the connector terminal 131 is crimped, and is accommodated inside the housing body 132. Each electric wire packing 136 serves to prevent entry of water or the like from a space between each electric wire 111 and the housing body 132.

The rear holder 137 is a member that is accommodated, locked and fixed in the above-described opening on the opposite side of the housing body 132 so as to push the three electric wire packings 136 into the housing body 132 from the opposite side of the three electric wire packings 136 with respect to the fitting side. As shown in FIG. 3, the rear holder 137 is constituted of two parts, i.e., a first holder 137*a* and a second holder 137*b*, that sandwich the three electric wires 111 in a radial direction.

The first connector 12 and the second connector 13 have been explained so far, and next, other components of the wire harness 1 shown in FIG. 1 will be explained.

The shield braid 14 of the wire harness 1 is a shield member that is formed by knitting with metal wires in a tubular shape to accommodate the cable 11 and that is disposed throughout a portion between the first connector 12 and second connector 13.

The first shield shell 15 is a metal member which is fitted to the housing body 122 of the first connector 12 from the opposite side with respect to the fitting side for fitting with the mating connector, and fixed in a state where it is covered with one end opening portion of the shield braid 14. The fixation of the one end opening portion of the shield braid 14 to the first shield shell 15 is performed using a tightening ring 15*a* that is fitted from further outside of the shield braid 14 and tightened. As shown in FIG. 2, the first shield shell 15 is a metal member constituted of a shell body 151 and a shell flange 152 that are formed integrally. The shell body 151 is a tubular portion which is fitted to the housing body 122 from the opposite side with respect to the fitting side, is further covered with the one end opening portion of the shield braid 14, and is tightened and fixed by the tightening ring 15*a*. The shell flange 152 is a portion that extends circumferentially around and radially outward from an edge of a tube aperture 151*a* of the shell body 151 located on the fitting side, and serves as a fixing flange for fixing the first connector 12 to a predetermined fixing position. A pair of arms 152*a* extends from the shell flange 152 for screw fixing, and a through hole 152*b* is formed on each arm 152*a* for screw fixing.

Further, the shell flange 152 is formed to project so as to overlap the first flange 123 and the second flange 124 (FIG. 4). The shell flange 152 includes, on the fitting side, a first flange recess 153 and a second flange recess 154 so that the first flange 123 and the second flange 124 fit one-to-one to the first flange recess 153 and the second flange recess 154 from the above-described opposite side. The first flange recess 153 and the second flange recess 154 are formed to have a width in the circumferential direction D13 of the housing body 122 that is tailored to a width of a corresponding flange of the first flange 123 and the second flange 124.

The second shield shell 16 is a metal member which is fitted to the housing body 132 of the second connector 13 from the opposite side with respect to the fitting side for fitting with the mating connector, and fixed in a state where it is covered with another end opening portion of the shield braid 14. The fixation of the another end opening portion of the shield braid 14 to the second shield shell 16 is performed using a tightening ring 16*a* that is fitted from further outside of the shield braid 14 and tightened. As shown in FIG. 3, the second shield shell 16 is a metal member constituted of a shell body 161 and a shell flange 162 that are formed integrally. The shell body 161 is a tubular portion which is fitted to the housing body 132 from the opposite side with respect to the fitting side, is further covered with the another end opening portion of the shield braid 14, and is tightened and fixed by the tightening ring 16*a*. The shell flange 162 is a portion that extends circumferentially around and radially outward from an edge of a tube aperture 161*a* of the shell body 161 located on the fitting side so as to have a substantially rectangular profile in plan view, and serves as a fixing flange for fixing the second connector 13 to a predetermined fixing position. The shell flange 162 is provided with a brim portion 162*a* that is bent at a substantially right angle with its one long side as a bending line, and through holes 162*b* for screw fixing are formed on both ends of the brim portion 162*a*.

Further, the shell flange 162 is formed to project so as to overlap the first flange 133 and the second flange 134 (FIG. 5). The shell flange 162 includes, on the fitting side, a first flange recess 163 and a second flange recess 164 so that the first flange 133 and the second flange 134 fit one-to-one to the first flange recess 163 and the second flange recess 164 from the above-described opposite side. The first flange recess 163 and the second flange recess 164 are formed to have a width in the circumferential direction D14 of the housing body 132 that is tailored to a width of a corresponding flange of the first flange 133 and the second flange 134.

FIG. 4 shows plan views of the housing and the first shield shell of the first connector shown in FIG. 2 that are shown one on the another and each viewed from the fitting side.

As shown in FIG. 4, the housing body 122 of the first connector 12 has, in plan view from the fitting side, an oval shape defined by a pair of long sides parallel to each other and semicircles connecting ends of the long sides to each other. The first flange 123 is provided on one long side and has a rectangular shape in plan view, and the second flange 124 is provided on another long side and has a rectangular shape in plan view.

The first flange 123 includes a rectangular plate portion 123*a*, a peripheral wall portion 123*b*, and a plurality of rib walls 123*c*. The rectangular plate portion 123*a* is a portion that projects from one long side of the outer circumferential surface 122*b* of the housing body 122 with its long side arranged along the outer circumferential surface 122*b*. The peripheral wall portion 123*b* is a wall portion standing toward the fitting side from three sides of the periphery of the rectangular plate portion 123*a* other than one side on the outer circumferential surface 122*b* side. The peripheral wall portion 123*b*, the outer circumferential surface 122*b* and the rectangular plate portion 123*a* together define a rectangular space. The plurality of rib walls 123*c*, which is four rib walls 123*c* in this embodiment, are standing inside the peripheral wall portion 123*b* from a surface of the rectangular plate portion 123*a* on the fitting side, and are arranged at a predetermined interval d11 in the circumferential direction D13 of the housing body 122. These four rib walls 123*c* divide the above-described rectangular space into five spaces at substantially equal intervals.

The second flange 124 includes a rectangular plate portion 124*a*, a peripheral wall portion 124*b*, and a plurality of rib walls 124*c*. The rectangular plate portion 124*a* is a portion that projects from the another long side of the outer circumferential surface 122*b* of the housing body 122 with its long side arranged along the outer circumferential surface 122*b*. The peripheral wall portion 124*b* is a wall portion standing toward the fitting side from three sides of the periphery of the rectangular plate portion 124*a* other than one side on the outer circumferential surface 122*b* side. The peripheral wall portion 124*b*, the outer circumferential surface 122*b* and the rectangular plate portion 124*a* together define a rectangular space. The plurality of rib walls 124*c*, which is nine rib walls 124*c* in this embodiment, are standing inside the peripheral wall portion 124*b* from a surface of the rectangular plate portion 124*a* on the fitting side, and are arranged at a predetermined interval d12 in the circumferential direction D13 of the housing body 122. These four rib walls 124*c* divide the above-described rectangular space into ten spaces at substantially equal intervals.

In this embodiment, the first flange 123 is formed to project from the outer circumferential surface 122*b* of the housing body 122 at a middle position in the axial direction D11 and has a first width W11 in the circumferential direction D13 of the housing body 122. Further, the second flange 124 is formed to project at the above-described middle position and at a position apart from the first flange 123 in the circumferential direction D13 and has a second width W12 in the circumferential direction D13, the second width W12 differing from the first width W11 of the first flange 123. In this embodiment, the second width W12 of the second flange 124 is greater than the first width W11 of the first flange 123. The shell flange 152 includes, in the circumferential direction D13, the first flange recess 153 having a width corresponding to the first width W11 so the first flange 123 fits therein, and the second flange recess 154 having a width corresponding to the second width W12 so the second flange 124 fits therein.

FIG. 5 shows plan views of the housing and the second shield shell of the second connector shown in FIG. 3 that are shown one on the another and each viewed from the fitting side.

As shown in FIG. 5, the housing body 132 of the second connector 13 also has an oval shape in plan view from the fitting side similar to that of the housing body 122 of the first connector 12 shown in FIG. 4. The first flange 133 is provided on one long side and has a rectangular shape in plan view, and the second flange 134 is provided on another long side and has a rectangular shape in plan view.

The first flange 133 includes a rectangular plate portion 133*a*, a peripheral wall portion 133*b*, and a plurality of rib walls 133*c*. The rectangular plate portion 133*a* is a portion that projects from one long side of the outer circumferential surface 132*b* of the housing body 132 with its long side arranged along the outer circumferential surface 132*b*. The peripheral wall portion 133*b* is a wall portion standing toward the fitting side from three sides of the periphery of the rectangular plate portion 133*a* other than one side on the outer circumferential surface 132*b* side. The peripheral wall portion 133*b*, the outer circumferential surface 132*b* and the rectangular plate portion 133*a* together define a rectangular space. The plurality of rib walls 133*c*, which is two rib walls 133*c* in this embodiment, are standing inside the peripheral wall portion 133*b* from a surface of the rectangular plate portion 133*a* on the fitting side, and are arranged at a predetermined interval d13 in the circumferential direction D14 of the housing body 132. These two rib walls 133*c* divide the above-described rectangular space into three spaces at substantially equal intervals.

The second flange 134 includes a rectangular plate portion 134*a*, a peripheral wall portion 134*b*, and a plurality of rib walls 134*c*. The rectangular plate portion 134*a* is a portion that projects from the another long side of the outer circumferential surface 132*b* of the housing body 132 with its long side arranged along the outer circumferential surface 132*b*. The peripheral wall portion 134*b* is a wall portion standing toward the fitting side from three sides on the periphery of the rectangular plate portion 134*a* other than one side on the outer circumferential surface 132*b* side. The peripheral wall portion 134*b*, the outer circumferential surface 132*b* and the rectangular plate portion 134*a* together define a rectangular space. The plurality of rib walls 134*c*, which is nine rib walls 134*c* in this embodiment, are standing inside the peripheral wall portion 134*b* from a surface of the rectangular plate portion 134*a* on the fitting side, and are arranged at a predetermined interval d14 in the circumferential direction D14 of the housing body 132. These four rib walls 134*c* divide the above-described rectangular space into ten spaces at substantially equal intervals.

Further, in this embodiment, the first flange 133 is formed to project from the outer circumferential surface 132*b* of the housing body 132 at a middle position in the axial direction D12 and has a first width W13 in the circumferential direction D14 of the housing body 132. Further, the second flange 134 is formed to project at the above-described middle position and at a position apart from the first flange 133 in the circumferential direction D14 and has a second width W14 in the circumferential direction D14, the second width W14 differing from the first width W13 of the first flange 133. In this embodiment, the second width W14 of the second flange 134 is greater than the first width W13 of the first flange 133. The shell flange 162 includes, in the circumferential direction D14, the first flange recess 163 having a width corresponding to the first width W13 so that the first flange 133 fits therein, and the second flange recess 164 having a width corresponding to the second width W14 so that the second flange 134 fits therein.

In this embodiment, the intervals d11, d13 for the rib walls 123*c*, 133*c* of the first flanges 123, 133 differ between the first connector 12 and the second connector 13. As a result of this difference in the intervals d11, d13, the first flanges 123, 133 have, on the fitting sides thereof for the fitting with the mating connectors, the rugged shapes that differ between the first connector 12 and the second connector 13. Further, the intervals d12, d14 for the rib walls 124*c*, 134*c* of the second flanges 124, 134 also differ between the first connector 12 and the second connector 13. As a result of this difference in the intervals d12, d14, the second flanges 124, 134 also have, on the fitting sides thereof for the fitting with the mating connectors, the rugged shapes that differ between the first connector 12 and the second connector 13.

In addition, in this embodiment, the first widths W11, W13 of the first flanges 123, 133 differ from each other between the first connector 12 and the second connector 13. Further, the second widths W12, W14 of the second flanges 124, 134 also differ from each other.

In this embodiment, the first connector 12 shown in the exploded perspective view in FIG. 3 and the second connector 13 shown in the exploded perspective view in FIG. 4 are both assembled by installing the housing bodies 122, 132 to jigs described hereinafter. This assembly operation is substantially the same between the first connector 12 and the second connector 13. In the following, this assembly operation will be explained with reference to the first connector 12 as a representative example.

Figure 6:
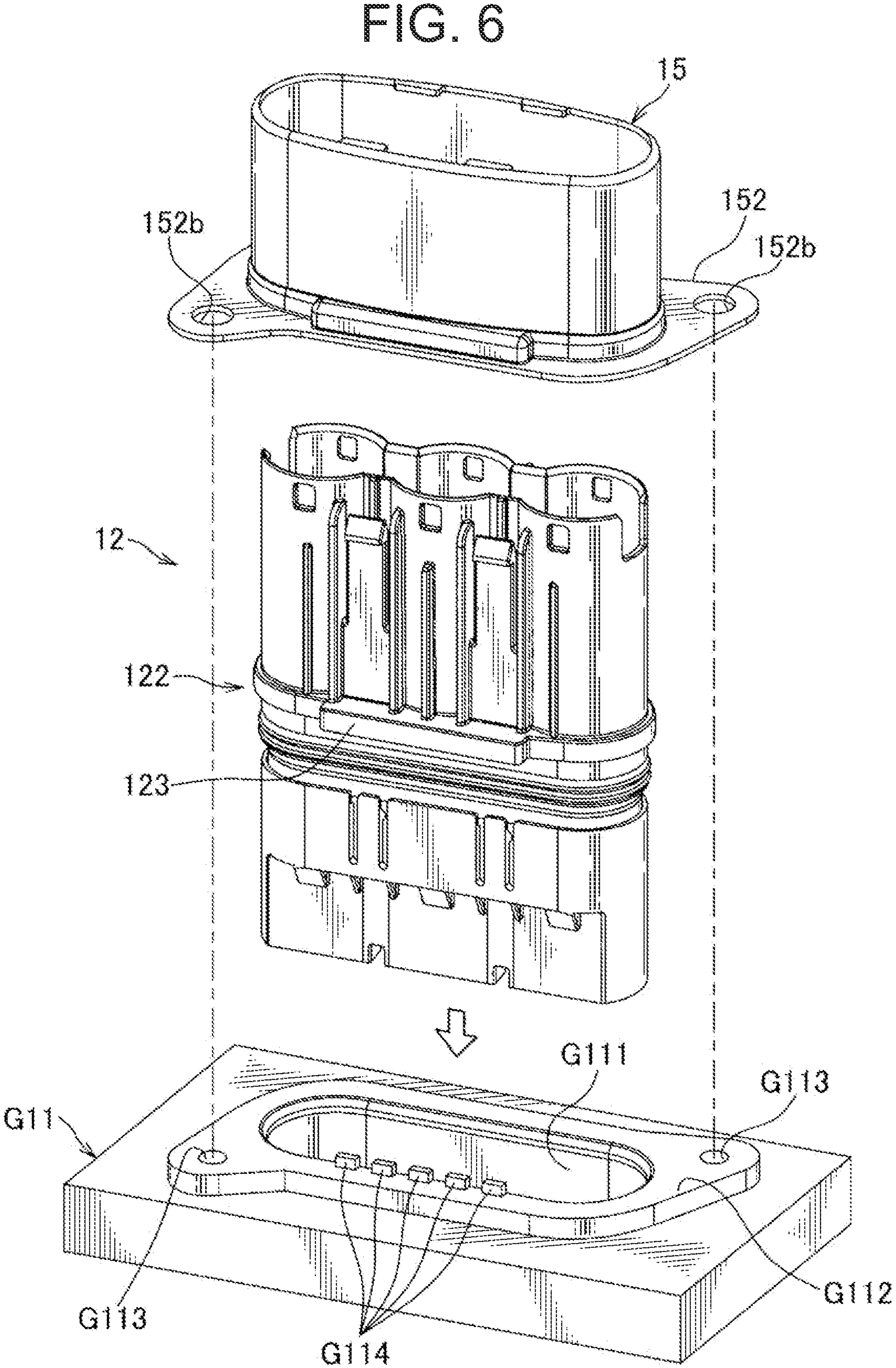
FIG. 6 is a schematic diagram showing how the housing body is installed onto a jig in an assembly operation of the first connector.
Figure 7:
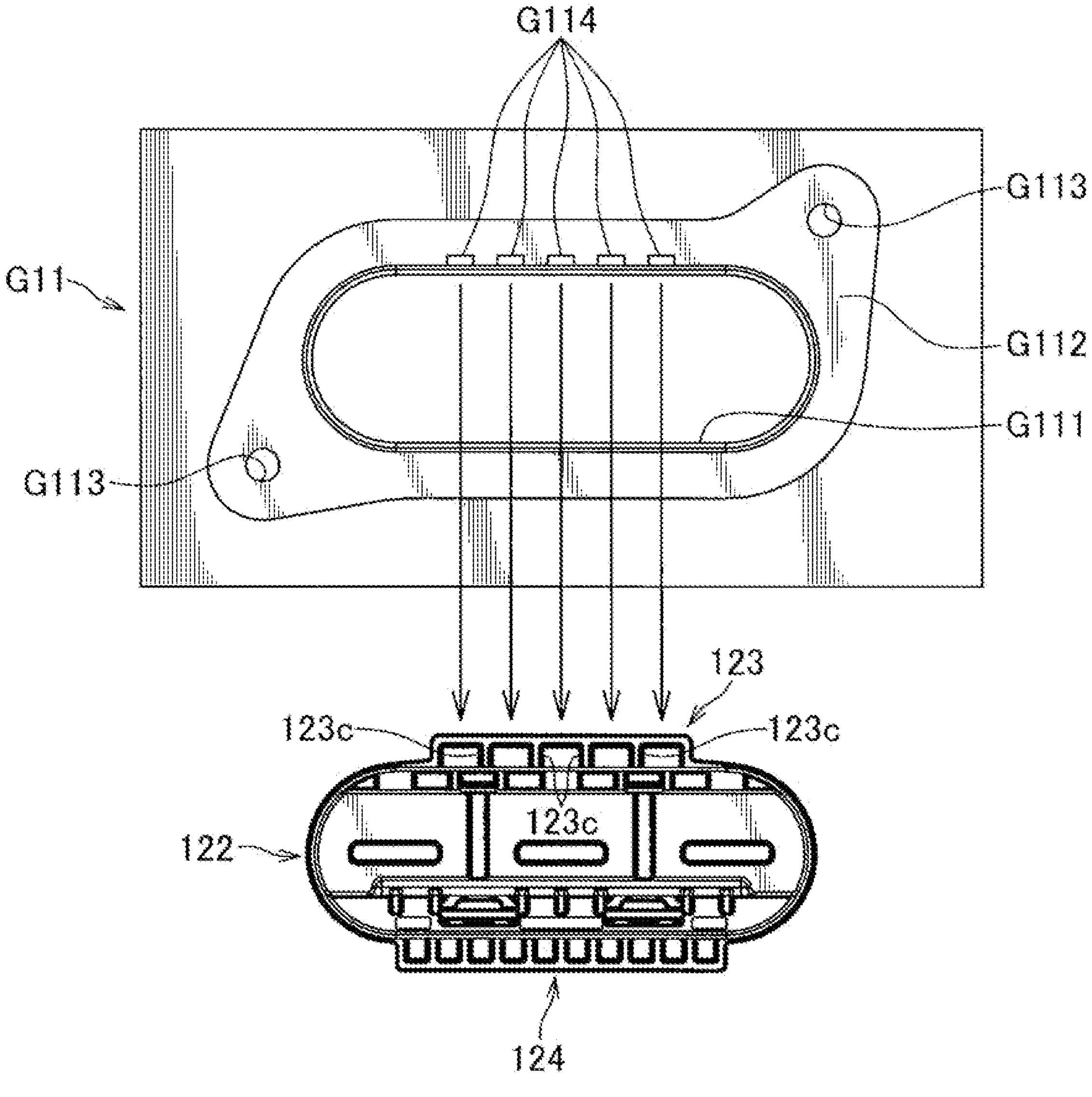
FIG. 7 shows plan view of the jig shown in FIG. 6 viewed from its installation side on which the housing body is installed, and the plan view is shown next to the plan view of the housing body similar to that of FIG. 4.

FIG. 6 is a schematic diagram showing how the housing body is installed to a jig in the assembly operation of the first connector. FIG. 7 is plan view of the jig shown in FIG. 6 which is viewed from an installation side on which the housing body is installed and which is shown next to plan view of the housing body similar to that of FIG. 4.

As shown in FIG. 6 and FIG. 7, a jig G11 used in the assembly operation of the first connector 12 is a plate member including an insertion hole G111 having an oval shape through which the fitting side of the housing body 122 is inserted. Further, the jig G11 includes a seat portion G112 which is a periphery of the insertion hole G111 that is raised in the same shape as the shape of the shell flange 152 of the first shield shell 15 in plan view from the fitting side. The seat portion G112 includes mounting holes G113 disposed at positions corresponding to the through holes 152*b* for screw fixing of the shell flange 152.

In the assembly operation of the first connector 12, firstly, the housing body 122 is installed to the jig G11 by inserting the fitting side of the housing body 122 into the insertion hole G111. The seat portion G112 of the jig G11 is provided with five protrusions G114 standing at a position corresponding to the first flange 123. As shown in FIG. 7, these five protrusions G114 are formed such that the respective protrusions G114 fit into the five spaces defined by the four rib walls 123*c* of the first flanges 123. The housing body 122 is installed to the jig G11 such that the five protrusions G114 are fitted into the above-described five spaces of the first flange 123, and the second flange 124 is placed on the opposite side of the protrusions G114 on the seat portion G112. Then, with respect to the housing body 122 in this state, the connector terminals 121 crimped to the respective ends of the three electric wires 111 are inserted and accommodated. At this time, the electric wire packing 126 is attached in advance to each electric wire 111, and the connector terminals 121 together with the electric wire packings 126 are accommodated inside the housing body 122. Subsequently, the rear holder 127 is arranged so as to sandwich the three electric wires 111 with the first holder 127*a* and the second holder 127*b*, and is accommodated in the opening of the housing body 122 so as to push the electric wire packings 126 therein. Further, the first shield shell 15 to which the end opening portion of the shield braid 14 is fixed in a tightened manner is attached to the housing body 122 such that the cable 11 consisting of three electric wires 111 are accommodated in the shield braid 14. At this time, the first shield shell 15 is attached in an orientation in which the first flange 123 is fitted in the first flange recess 153 and the second flange 124 is fitted in the second flange recess 154.

In this way, the first connector 12 is assembled. The second connector 13 is assembled with the similar procedure, thereby providing the completed wire harness 1 shown in FIG. 1. When assembling the second connector 13, a dedicated jig, which is provided with three protrusions G114 configured to fit into the three spaces defined by the two rib walls 133*c* of the first flange 133 of the second connector 13, is used.

In this embodiment, the first connector 12 and second connector 13 are similar connectors in which the shapes of the housing bodies 122, 132, the configurations of the housing bodies 122, 132 for housing the connector terminals 121, 131, etc. are similar to each other. This similarity may cause a risk of wrong assembly that a connector different from a connector to be properly mounted could be mounted on one cable end 11*a*.

To avoid such risk, in the wire harness 1 of the above-described embodiment, the housing bodies 122, 132 of the first connector 12 and the second connector 13 are provided with the first flanges 123, 133 having rugged shapes that are different from each other. Further, in this embodiment, in the assembly operation of the first connector 12, the dedicated jig G11 configured to fit to the rugged shape of the first flange 123 is used.

Similarly, in the assembly operation of the second connector 13, the dedicated jig configured to fit to the rugged shape of the first flange 133 is used. Consequently, for example during the assembly operation of the first connector 12, even when a worker erroneously attempts to install the housing body 132 of the second connector 13, it cannot be installed because the jig G11 does not fit to the rugged shape of the first flange 133 of the second connector 13. Thus, according to the wire harness 1 of this embodiment, with the rugged shapes of the first flanges 123, 133 that differ between the first connector 12 and the second connector 13, an operation can be carried out using the dedicated jig in each assembly operation. By performing such operation based on the rugged shapes of the first flanges 123, 133, wrong assembly of the connector during manufacture can be prevented.

In this embodiment, the intervals d11, d13 of the plurality of rib walls 123*c*, 133*c* of the first flanges 123, 133 differ between the first connector 12 and the second connector 13. According to this configuration, wrong assembly of the connector can be prevented efficiently with a simple structure of the jigs, the jigs for installing the housing bodies 122, 132 being provided with the protrusions that fit to the spaces defined by the rib walls 123*c*, 133*c*.

Further, in this embodiment, the wire harness 1 includes the shield braid 14, the first shield shell 15, and the second shield shell 16. The shell flanges 152, 162 of the first shield shell 15 and the second shield shell 16 are provided with the first flange recesses 153, 163 and the second flange recesses 154, 164. The first flange recesses 153, 163 are recesses for accommodating the first flanges 123, 133, and the second flange recesses 154, 164 are recesses for accommodating the second flanges 124, 134. That is, in this embodiment, the first shield shell 15 and the second shield shell 16 to which the shield braid 14 is mounted are provided with the shell flanges 152, 162 corresponding to the flanges of the respective connectors. By using the first shield shell 15 and the second shield shell 16 as described, the shield braid 14 can be mounted so as to effectively avoid the flanges intended for preventing the wrong assembly, thereby providing the wire harness 1 suitable for the transmission of high-frequency electrical signals.

Further, in this embodiment, the first connector 12 and second connector 13 include the first flanges 123, 133 and the second flanges 124, 134 having widths different from each other. Also, the respective shell flanges 152, 162 include the first flange recesses 153, 163 and the second flange recesses 154, 164 to which the first flanges 123, 133 and the second flanges 124, 134 fit in a one-to-one manner. According to this configuration, the mounting orientation of the first shield shell 15 and the second shield shell 16 with respect to the first connector 12 and second connector 13 are uniquely determined to be the orientation in which the two flanges fit into the two flange recesses.

That is, the above configuration can prevent wrong assembly also for the mounting orientation of the first shield shell 15 and the second shield shell 16 with respect to the first connector 12 and second connector 13.

Further, in this embodiment, both of the first widths W11, W13 of the first flanges 123, 133 and the second widths W12, W14 of the second flanges 124, 134 differ between the first connector 12 and the second connector 13. According to this configuration, wrong assembly can be effectively prevented for the installation of the first shield shell 15 and second shield shell 16 with respect to the housing bodies 122 and 132.

The embodiments described above only illustrate representative embodiments, and the wire harness is not limited to the embodiments described above. In other words, various modifications can be made without departing from its gist. As long as such modification includes the configuration of the wire harness, they are within its scope.

For example, in the above-described embodiment, the wire harness 1 in which the first connector 12 and the second connector 13 are mounted on the two cable ends 11*a* of one cable 11 having no branches is shown as one example of the wire harness.

However, the wire harness is not limited thereto; the wire harness may be branched so as to have three or more cable ends and a connector is mounted to each cable end.

Further, in the above-described embodiment, the wire harness 1 including the cable 11 formed by bundling the three electric wires 111 together is shown as one example of the wire harness. However, the wire harness is not limited thereto; the wire harness may include a cable formed by bundling two electric wires together or a cable formed by bundling four or more electric wires together.

Further, in the above-described embodiment, the following shapes are shown as one example of the rugged shapes of the flanges. First, for the first flanges 123, 133, the plurality of rib walls 123*c*, 133*c* is standing inside the peripheral wall portions 123*b*, 133*b* and from the rectangular plate portions 123*a*, 133*a* at the intervals d11, d13. Further, for the second flanges 124, 134, the plurality of rib walls 124*c*, 134*c* is standing inside the peripheral wall portions 124*b*, 134*b* and from the rectangular plate portions 124*a*, 134*a* at the intervals d12, d14. However, the rugged shapes of the flanges are not limited thereto; the rugged shapes may be other than the arrangement of the rib walls, such as corrugations or dispersed arrangement of plurality of recesses, etc., as long as the shapes are different between the plurality of connectors of the wire harness. However, the rugged shapes constituted of the arrangement of the rib walls 123*c*, 124*c*, 133*c*, 134*c* can effectively prevent the wrong assembly of the connectors by using the simple jig structure of the jigs for installing the housing bodies 122, 132, as described above.

Further, the above-described embodiment shows, one example of the wire harness, the wire harness 1 adapted for high-frequency transmission that includes the shield braid 14, the first shield shell 15 and the second shield shell 16. The shell flanges 152, 162 of the first shield shell 15 and the second shield shell 16 are provided with the first flange recesses 153, 163 and the second flange recesses 154, 164. However, the wire harness is not limited thereto; it may be the one without the shield braid and such, e.g., a wire harness for power supply. However, according to the fixing structure of the shield braid 14 in the shield shell including the flange recesses, it is possible to provide the wire harness 1 for high-frequency transmission while effectively avoiding the flanges for the prevention of the wrong assembly, as described above. In the case of the wire harness for high-frequency transmission, the electric wire may be a shielded wire in which a shield braid is arranged within a sheath, eliminating the need for the shield braid arranged outside of the electric wire bundle.

Further, the above-described embodiment shows, as examples of the flanges, the first flange 123, 133 and the second flange 124, 134 which are disposed at the same position with respect to the axial direction D11, D12 and at the two distant positions with respect to the circumferential direction D13, D14 and which have different widths from each other. Further, as examples of the flange recesses there are shown the first flange recess 153, 163 and the second flange recess 154,164 to which the first flange 123, 133 and the second flange 124, 134 fit one-to-one. However, the flanges and the flange recesses are not limited thereto; for example, only one flange may be provided on the outer circumferential surface of the housing, and only one flange recess may be provided on the shell flange of the shield shell. However, by providing the two flanges having different widths and the two flange recesses into which these flanges fit one-to-one, it is possible to prevent the wrong assembly also with respect to the mounting orientation of the first shield shell 15 and the second shield shell 16, as described above. In the case where the plurality of flanges and the plurality of flange recesses are provided, the number thereof is not limited to two, and three or more flanges may be provided on the outer circumferential surface of the housing and the three or more flange recesses may be provided on the shell flange of the shield shell such that the flanges fit one-to-one into these flange recesses.

Further, the above-described embodiment shows, as one example of the wire harness, the wire harness 1 in which both of the first flange 123, 133 and the second flange 124, 134 have the width in the circumferential direction D14 that differ between the first connector 12 and the second connector 13. However, the wire harness is not limited thereto; the width of the flanges may be the same between the plurality of connectors. However, by making the widths of the first flange 123, 133 and the second flange 124, 134 different between the first connector 12 and the second connector 13, it is possible to effectively prevent the wrong assembly of the first shield shell 15 and the second shield shell 16, as described above. In addition, not all of the plurality of flanges provided on the housing need to have width different between the connectors, at least one flange may have width different between the connectors.

LIST OF REFERENCE SIGNS

1 wire harness
11 cable
11*a* cable end
12 first connector
13 second connector
14 shield braid
15 first shield shell
15*a*, 16*a* tightening ring
16 second shield shell
111 electric wire
121, 131 connector terminal
122, 132 housing body
122*a*, 132*a* opening
122*b* outer circumferential surface
123, 133 first flange
123*a*, 124*a*, 133*a*, 134*a* rectangular plate portion
123*b*, 124*b*, 133*b*, 134*b* peripheral wall portion
123*c*, 124*c*, 133*c*, 134*c* rib wall
124, 134 second flange
125, 135 connector fitting packing
126, 136 electric wire packing
127, 137 rear holder
127*a*, 137*a* first holder
127*b*, 137*b* second holder
151, 161 shell body
151*a*, 161*a* tube aperture
152, 162 shell flange
152*a* arm
152*b*, 162*b* through hole
153, 163 first flange recess
154, 164 second flange recess
162*a* brim portion
d11, d12, d13, d14 interval
D11, D12 axial direction
D13, D14 circumferential direction
G11 jig
G111 insertion hole
G112 seat portion
G113 mounting hole
G114 protrusion
W11, W13 first width
W12, W14 second width

What is claimed is:

1. A wire harness comprising:
a cable constituted of a plurality of electric wires bundled together so as to provide a plurality of cable ends; and
a plurality of connectors mounted one-to-one on the plurality of cable ends;
wherein each of the plurality of connectors includes
a connector terminal connected to an end of the electric wire,
a housing body having a tube shape that accommodates therein the connector terminal, and
a flange formed to project from an outer circumferential surface of the housing body,
wherein, on a fitting side for fitting with a mating connector, the flange has a rugged shape that differs between the plurality of connectors,
wherein the flange includes:
a plate portion extending so as to project from the outer circumferential surface,
a peripheral wall portion standing from an outer periphery of the plate portion so as to extend toward the fitting side, and
a plurality of rib walls which is disposed inside the peripheral wall portion and which is standing from a surface of the plate portion on the fitting side and arranged at a predetermined interval in a circumferential direction of the housing body, and
wherein the interval between the plurality of rib walls differs between the plurality of connectors.

2. A wire harness comprising:
a cable constituted of a plurality of electric wires bundled together so as to provide a plurality of cable ends; and
a plurality of connectors mounted one-to-one on the plurality of cable ends;
wherein each of the plurality of connectors includes:
a connector terminal connected to an end of the electric wire,
a housing body having a tube shape that accommodates therein the connector terminal, and a flange formed to project from an outer circumferential surface of the housing body, wherein, on a fitting side for fitting with a mating connector, the flange has a rugged shape that differs between the plurality of connectors, wherein a shield braid which is formed in a tubular shape to accommodate therein the cable and which is disposed throughout a portion between the plurality of connectors, and wherein a shield shell made of metal which is fitted to the housing body of each of the plurality of connectors from an opposite side with respect to the fitting side and fixed in a state where the shield braid is put on the shield shell, and wherein the shield shell includes:

wherein a shell body having a tube shape which is fitted to the housing body from the opposite side and fixed in a state where the shield braid is put on the shell body, and wherein a shell flange which is formed to project from an edge of a tube aperture of the shell body on the fitting side so as to overlap the flange, and wherein the shell flange includes a flange recess, and wherein a width of the flange recess in a circumferential direction of the housing body is tailored to a width of the flange such that the flange fits, from the opposite side, to the fitting side of the flange shell.

3. The wire harness according to claim 2, wherein the flanges are provided at the same position with respect to an axial direction of the housing body and at a plurality of positions apart from each other with respect to the circumferential direction of the housing body, the flanges having widths in the circumferential direction different from each other, and wherein a plurality of the flange recesses is provided so as to receive a plurality of the flanges in a one-to-one manner, each of the flange recesses having a width in the circumferential direction that is tailored to a width of the corresponding flange.

4. The wire harness according to claim 3, wherein at least one flange of the plurality of flanges has a width in the circumferential direction that differs between the plurality of connectors.

* * * * *